US008620383B2

(12) United States Patent
Panchal et al.

(10) Patent No.: US 8,620,383 B2
(45) Date of Patent: Dec. 31, 2013

(54) DYNAMIC RESOURCE SHARING AMONG CELLULAR NETWORKS

(75) Inventors: Jignesh S. Panchal, Somerset, NJ (US); Milind M. Buddhikot, Bridgewater, NJ (US)

(73) Assignee: Alcatel Lucent, Paris (FR)

(*) Notice: Subject to any disclaimer, the term of this patent is extended or adjusted under 35 U.S.C. 154(b) by 0 days.

(21) Appl. No.: 13/253,120

(22) Filed: Oct. 5, 2011

(65) Prior Publication Data

US 2013/0090124 A1    Apr. 11, 2013

(51) Int. Cl.
*H04B 1/38* (2006.01)
(52) U.S. Cl.
USPC ............. 455/561; 455/452.1; 455/456.5; 455/560; 370/336; 370/329; 370/437
(58) Field of Classification Search
None
See application file for complete search history.

(56) References Cited

U.S. PATENT DOCUMENTS

| 2011/0130118 | A1* | 6/2011 | Fan et al. ................. 455/411 |
| 2011/0275342 | A1* | 11/2011 | Ramle et al. ............. 455/404.1 |
| 2012/0076125 | A1* | 3/2012 | Kopplin ................... 370/338 |
| 2012/0129488 | A1* | 5/2012 | Patterson et al. ........ 455/406 |
| 2013/0017826 | A1* | 1/2013 | Bergquist et al. ........ 455/426.1 |
| 2013/0095826 | A1* | 4/2013 | Vrbaski et al. .......... 455/432.3 |
| 2013/0102356 | A1* | 4/2013 | Shaw ....................... 455/525 |

OTHER PUBLICATIONS

3GPP TS 36.133, Evolved Universal Terrestrial Radio Access (E-ULTRA) and Evolved Universal Terrestrial Radio Access Network (E-UTRAN)—Requirements for support of radio resource management, 106 pages, V10.4.0 (Sep. 2011), Valbonne—France, http://www.3gpp.org/ftp/Specs/html-info/36133.htm.
3GPP TS 36.214, Evolved Universal Terrestrial Radio Access (E-UTRA) and Evolved Universal Terrestrial Radio Access Network (E-UTRAN)—Physical Layer Measurements. 14 pages, V10.1.0 (Mar. 2011), Valbonne—France, http://www.3gpp.org/ftp/Specs/html-info/36214.htm.
3GPP TS 36.300, Evolved Universal Terrestrial Radio Access (E-UTRA) and Evolved Universal Terrestrial Radio Access Network (E-UTRAN)—Overall description. pp. 1-37, pp. 58-89, pp. 116-119, pp. 120-154, V10.4.0 (Jun. 2011), Valbonne—France, http://www.3gpp.org/ftp/Specs/html-info/36300.htm.

(Continued)

*Primary Examiner* — Rafael Pérez-Gutiérrez
*Assistant Examiner* — Keith Fang
(74) *Attorney, Agent, or Firm* — Harness, Dickey & Pierce

(57) ABSTRACT

According to a disclosed method, an MME in a network analyzes KPIs from the cells it serves and based on the KPIs, it decides to engage in sharing. The MME then contacts a sharing entity (SE) to announce that it wants to borrow or to supply resources. The MME obtains terms of a sharing agreement from the SE and the MME obtains the identity of the other network. In response to this information, the MME configures its network elements to share. The MME's own network may be a supplier or a borrower. If the network is a supplier, the MME configures its base stations to support UEs subscribing to the other network. If the network is a borrower, the MME configures its UEs to accept service from the other network's base stations. The SE applies knowledge of network topology and of services offered. This knowledge is obtained from a sharing database. At the expiration of the sharing agreement, the SE tells the MMEs to deactivate the sharing agreement.

20 Claims, 8 Drawing Sheets

(56) References Cited

OTHER PUBLICATIONS

3GPP TS 36.331, Evolved Universal Terrestrial Radio Access (E-UTRA) and Evolved Universal Terrestrial Radio Access Network (E-UTRAN)—Radio Resource Control (RRC) and protocol specification. 106 pages, V10.3.0 (Sep. 2011), Valbonne—France, http://www.3gpp.org/ftp/Specs/html-info/36331.htm.

3GPP TS 23.251, Network Sharing; Architecture and functional description. 28 pages, V11.0.0 (Sep. 2011), Valbonne—France, http://www.3gpp.org/ftp/Specs/html-info/23251.htm.

3GPP TS 25.304, Evolved Universal Terrestrial Radio Access (E-UTRA) and Evolved Universal Terrestrial Radio Access Network (E-UTRAN)—User Equipment (UE) procedures in idle mode and procedures for cell reselection in connected mode. 52 pages, V10.1.0 (Jun. 2011), Valbonne—France, http://www.3gpp.org/ftp/Specs/html-info/25304.htm.

Caroline Gabriel, "Swedish operators take RAN sharing trend into LTE", Rethink Wireless, Apr. 14, 2009, 3 pages. http://www.rethink-wireless.com/article.asp?article_id=1262.

Roy Rubenstein, "Technology trends: Mobile network sharing: Share issues", Total Telecom, Jun. 25, 2009, 2 pages. http://www.totaltele.com/view.aspx?ID=446761.

Dr. Alastair Brydon, 3G-Infrastructure Sharing: The Future for Mobile Networks, Analysis Mason Group, Feb. 2008, 6 pages. http://www.researchandmarkets.com/reports/591031/3g_infrastructure_sharing_the_future_for_mobile.

Unwired Insight, "Extensive coverage is essential to achieve high penetration of mobile broadband," Jul. 18, 2011. "Scenarios for the Future of the Global Wireless Industry," Dec. 7, 2010. "3G Infrastructure Sharing," Dec. 6, 2010. "Extensive 3G infrastructure sharing is now inevitable," Feb. 28, 2008. "The future looks uncertain for mobile equipment vendors," Feb. 20, 2008. "Mobile Operators must develop a robust business case for femtocells," Nov. 30, 2007. "Decision time for mobile operators faced with declining spend," Jun. 15, 2007. 10 pages, http://www.unwiredinsight.com.

Milind M. Buddhikot, Cognitive Radio, DSA and Self-X: Toward Next Transformation in Cellular Networks (Invited Position Paper) Proceedings of IEEE DySPAN 2010, Singapore, Apr. 2010, 5 pages.

M. Buddhikot, P. Kolodzy, S. Miller, K. Ryan and J. Evans, DIMSUMnet: New Directions in Wireless Networking Using Coordinated Dynamic Spectrum Access, Position Paper in IEEE International Symposium on a World of Wireless, Mobile and Multimedia Networks (IEEE WoWMoM 2005), Taromina/Giardini Naxos, Italy, Jun. 2005, 8 pages.

C. Gerami, N. Mandayam, L. Greenstein, Backhauling in TV White Spaces, Proc. IEEE Globecom 2010, 6 pages.

\* cited by examiner

RESOURCE SHARING PROCESS

DYNAMIC RESOURCE SHARING AMONG CELLULAR NETWORKS

FIELD OF THE INVENTION

The invention relates to methods and apparatus for operating radio access networks and core networks of wireless communication systems, and more particularly to methods and apparatus by which different networks can share resources.

ART BACKGROUND

One desired goal of cellular network operators (which we may also refer to as "service providers" or "operators") is to be able to provide uninterrupted services with quality and efficiency to as many mobile customers as possible. To approach this goal requires a favorable balance among customer experience and satisfaction, network performance, and costs.

One way for operators of different networks to improve performance and reduce their capital and operating costs is to share resources. That is, a given network is unlikely to use 100% of its resources 100% of the time. Therefore, there is an opportunity for different networks operating in a given geographical area to pool some of their respective resources to achieve greater overall efficiency. This can, for example, reduce the rate of outages and increase the effective network capacity and RF coverage without deploying more base stations.

However, there are still commercial and technical barriers to the achievement of large-scale resource sharing among cellular operators. Accordingly, there remains a need for methods of resource sharing that are technically and commercially feasible.

SUMMARY OF THE INVENTION

We have developed such a method.

In an embodiment, an MME in a network analyzes KPIs from the cells it serves and based on the KPIs, it decides to engage in sharing. The MME then contacts a sharing entity (SE) to announce that it wants to borrow or to supply resources. The MME obtains terms of a sharing agreement from the SE and the MME obtains the identity of the other network. In response to this information, the MME configures its network elements to share.

If the MME's own network is the supplier, the MME configures its base stations to support UEs subscribing to the other network. If the MME's own network is the borrower, the MME configures its UEs to accept service from the other network's base stations.

The SE applies knowledge of network topology and of services offered. This knowledge is obtained from a sharing database.

At the expiration of the sharing agreement, the SE tells the MMEs to deactivate the sharing agreement.

DETAILED DESCRIPTION

It is known that a mobile user terminal (i.e., a "UE" in the terminology we will adopt below) may be steered, i.e. that through network signaling it may be transferred from one network operator to another, e.g. temporarily or for the duration of the connection.

There are several known methods that support steering. One such method is the forced handover of active UEs from one operator to another. Another method is the broadcast of multiple operator identifiers (which are often referred to as "plmn ids") by cellsites. Because idle UEs typically select serving base stations on the basis of plmn id and received signal strength, steering of eligible idle UEs can be facilitated by such broadcasts. Another method is the updating of neighbor lists, which may include base stations that serve UEs subscribing to multiple operators. Yet another method is measurement configuration, according to which a UE periodically measures the received signal strength on certain channels from various base stations that can support it, and that may belong to different operators.

Also known is a so-called "cognitive" or "open access" UE, which is configured to select a serving base station which is "best" according to a criterion such as received signal strength, in which the selection is made among base stations belonging to any of various operators.

Because the above methods facilitate the steering of UEs among various network operators, they also provide support for implementations of our new method for resource sharing, as will be described below.

For purposes of illustration, we will describe embodiments of our invention with specific reference to LTE networks. However, such choice of network technology should be understood as merely illustrative, and not as limiting. In fact, our ideas are usefully employed in various other network technologies, such as CDMA.

Figure 1:
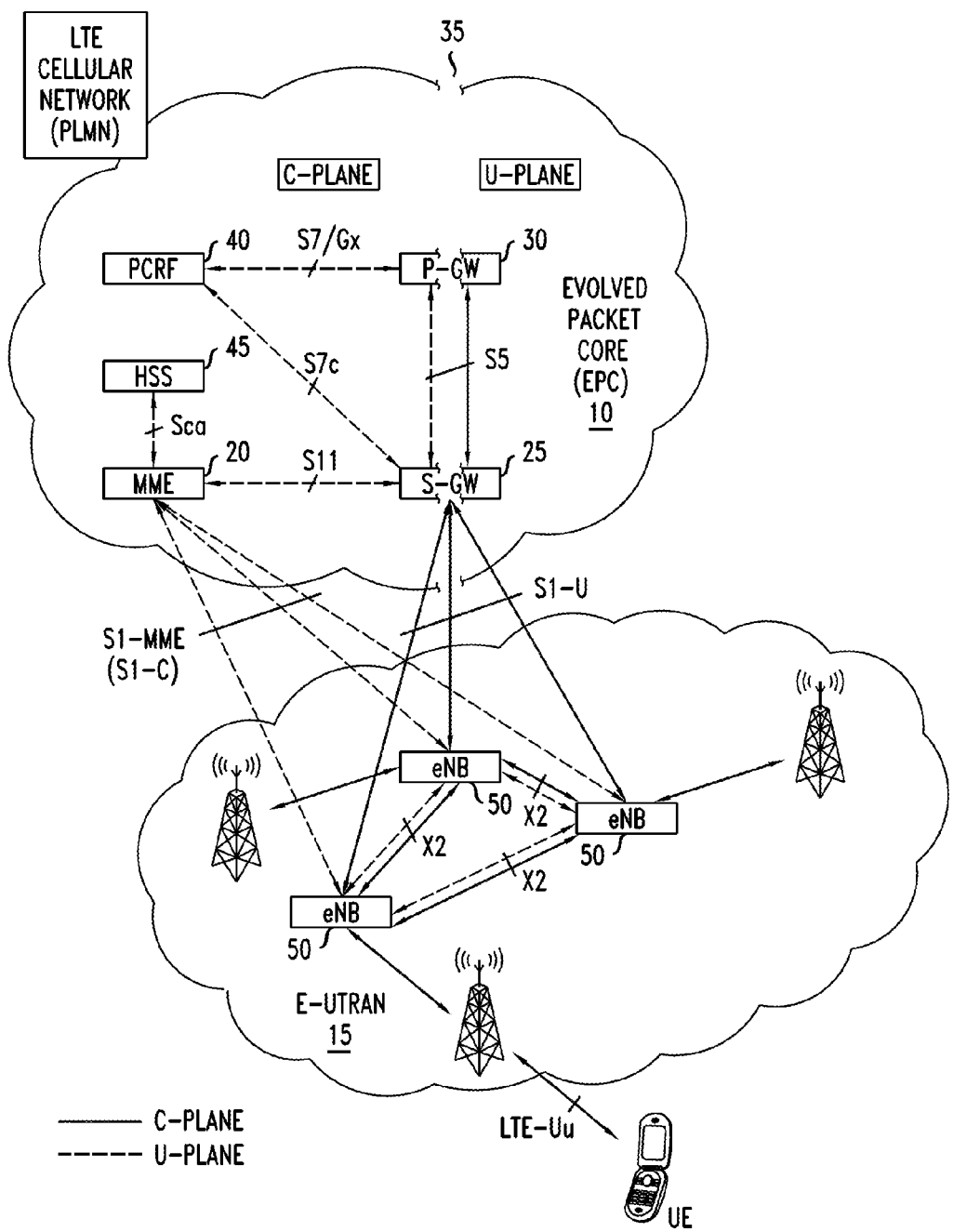
FIG. 1 is a schematic diagram illustrating the architecture of an LTE network of the prior art.

A brief description of LTE networks will now be provided with reference to FIG. 1.

LTE ("Long Term Evolution") is a Fourth Generation mobile cellular network technology that is evolved from UMTS, and that includes an all-IP networking architecture. LTE is being introduced through a series of releases by the 3rd Generation Partnership Project (3GPP). In LTE, the architecture of the GPRS core network is replaced by the System Architecture Evolution (SAE), which is a flat. IP-based network architecture. Because LTE is all-IP from end to end, the mobile handsets and other terminal devices for LTE have embedded IP capabilities, and the base stations, referred to as Evolved NodeBs (eNodeBs) are IP-based.

As seen in FIG. 1, the LTE system architecture includes core network 10, referred to as an Evolved Packet Core (EPC), and radio access network 15, referred to in LTE as an Evolved UTRAN (E-UTRAN). The entities in the E-UTRAN and EPC are interconnected via standardized IP-based interfaces.

With further reference to the figure, the EPC will be seen to include MME (Mobility Management Entity) 20, Serving Gateway (S-GW) 25, and Packet Gateway (P-GW) 30. The MME performs the signaling and control functions to manage the access by the mobile user terminals (referred to in LTE as UEs, for "user equipment") to network service. The MME also manages the assignment of network resources, and it manages the mobility states to support tracking, paging, roaming, and handovers. The MME also manages all other control-plane functions related to subscriber and session management.

The S-GW is a data plane element. Its primary function is to manage user-plane mobility and to act as a demarcation point between the radio access network (RAN) and the core networks. The SGW maintains data paths between eNodeBs and the P-GW.

The P-GW is the termination point of the packet data interface toward the packet data networks. As such, it is the entry and exit point for traffic for the UEs. The P-GW supports operator-defined policy for resource allocation and usage, packet filtering, and charging.

One feature of the EPC is a clear separation between the Control-plane (C-plane) and User-plane (U-plane) interfaces. This is advantageous because it allows independent scaling of the two planes in order to manage their latency performances. The C-plane includes interfaces to carry the user mobility, authentication and policies, entity configuration and OAM (Operation Administration and Management) related messages, whereas the U-plane interfaces carry user traffic. Expansion of the C-plane depends on the number of mobile terminals and their mobility patterns. Expansion of the U-plane depends on the aggregated data throughput requirements. As will be seen, the separation between these planes can facilitate capacity sharing among different LTE cellular networks.

The separation between the C-plane and the U-plane is delineated in FIG. 1 by conceptual boundary 35. It will be seen that on the control side of the boundary, there are two further network entities: PCRF 40 and HSS 45.

The PCRF supports service data flow detection, policy enforcement, and flow-based charging. (In LTE, a service data flow—SDF—is the virtual connection that carries data-plane traffic.) The HSS ("Home Subscriber Server") is a user database that supports the network entities that handle cells. The HSS contains subscription-related information such as subscriber profiles. It authenticates and authorizes users, and supports mobility management, call establishment, and IP session establishment. In its various functions, the HSS combines the earlier HLR ("Home Location Register") and AuC ("Authentication Center").

One significant feature of the E-UTRAN is a relatively flat architecture in which the radio network controller (RNC) and the Base Station Transreceiver (BTS) functionalities are integrated into a single entity, namely the eNodeB (eNB). The eNBs in FIG. 1 are designated by the reference numeral 50. As seen in the figure, the eNB manages three interfaces: It communicates with the EPC on the S1 (S1-C and S1-U combined) interface, it communicates with other eNBs on the X2 interface, and it communicates wirelessly with the UEs on the over-the-air (OTA), LTE-Uu interface.

Via the X2 interface, the eNB is fully connected to all other eNBs in the E-UTRAN. The X2 interface is designed to support user data (U-plane) forwarding from one eNB to another in handover operations and also to manage co-channel interference among eNBs using C-plane communication messages. Thus, the fully connected eNB is evolved into a cellular network edge router. As such, it uses the three interfaces to route data to its destinations, which include the other eNB, the EPC, and the UEs. As will be seen, the flat E-UTRAN and the eNB edge router can facilitate the dynamic sharing of the E-UTRAN and eNB with other LTE cellular networks.

Figure 2:
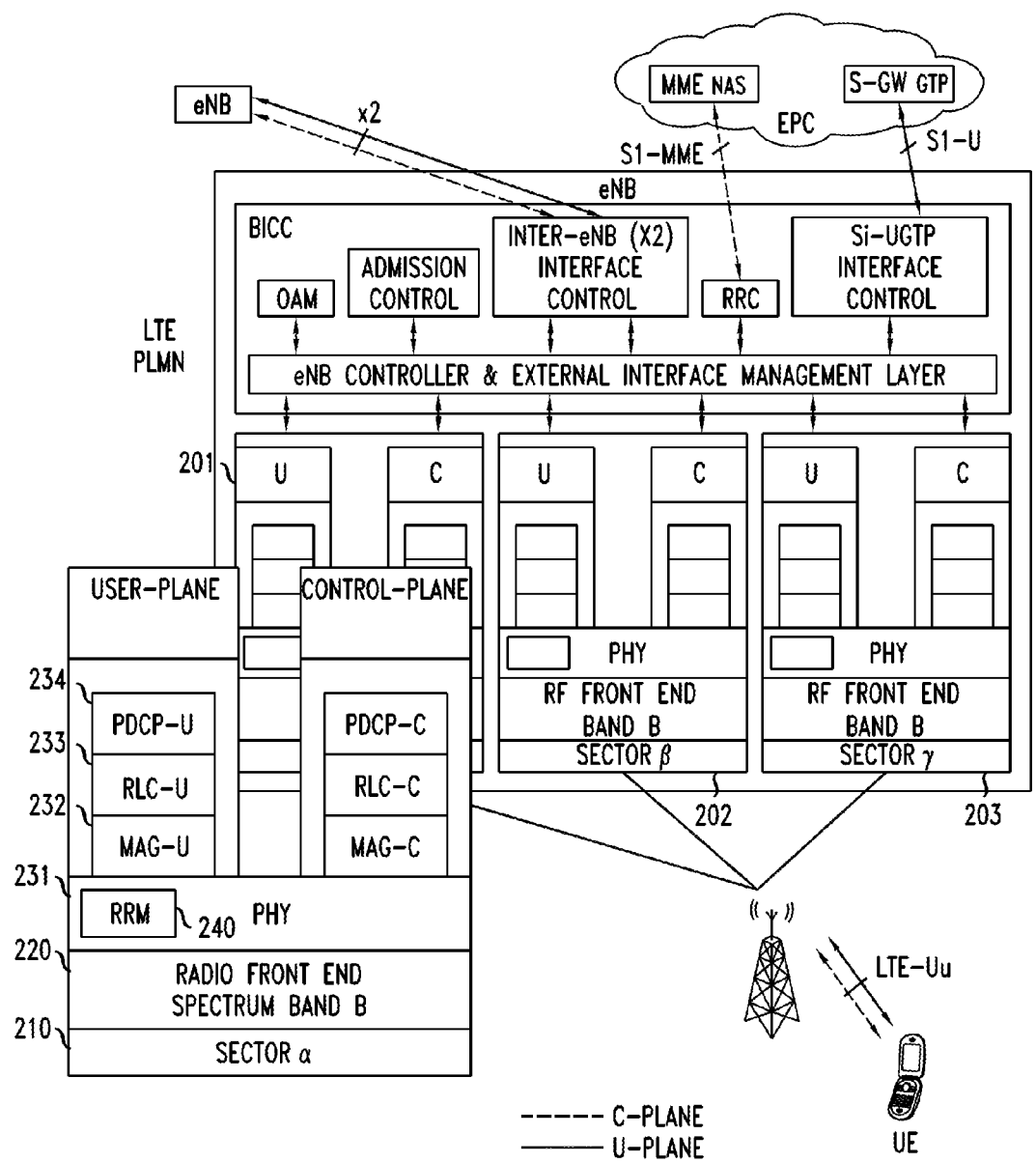
FIG. 2 is a conceptual block diagram of a typical eNB of an LTE network of the prior art.

FIG. 2 is a conceptual block diagram of a typical eNB of an LTE network, which is owned and operated by one single operator of an LTE Public Land Mobile Network (PLMN). As seen in the figure, the eNB has three antenna sectors 201, 202, and 203, which are respectively designated as sector α, sector β, and sector γ. The figure includes an expanded view 210 of sector α. For clarity, we note that in the nomenclature of the 3GPP standards, a sector of the eNB is referred as a cell. Herein, we will use the terms cell and sector interchangeably to refer to a sector of an eNB.

Each sector has an RF front end 220 that can be configured to operate on a carrier or a channel, designated in the figure as Spectrum Band B, that may be defined, e.g. by its center frequency and bandwidth. Separately implemented within each sector are the Physical Layer (PHY) 231, Medium Access Control Layer (MAC) 232, Radio Link Control Layer (RLC) 233, and Packet Data Control Protocol Layer (PDCP) 234. The PHY, MAC, RLC and PDCP layers together constitute LTE Layer 1.

The physical layer of the LTE air interface (LTE-Uu) uses Orthogonal Frequency Division Multiple Access (OFDMA) scheme on the downlink (DL), and it uses the Single Carrier Frequency Division Multiple Access (SC-FDMA) scheme on the uplink (UL). These FDMA schemes enable LTE to flexibly support the use of multiple carrier bandwidths, which typically include 1.4, 3, 5, 10, 15 and 20 MHz. LTE supports frequency division duplex (FDD) and time division duplex (TDD), and it also supports discontinuous spectrum aggregation.

The physical layer frame format is 10 ms long and contains ten sub-frames of 1 ms each. Each sub-frame can carry fourteen OFDM symbols. In frequency, each OFDM symbol spans twelve subcarriers, each having a bandwidth of 15 kHz.

The minimum unit of scheduling on both the uplink and the downlink is a frequency-time block referred to as a Physical Resource Block (PRB) or Resource Block (RB). Each PRB consists of fourteen OFDM symbols spanning the twelve subcarriers referred to above, and thus it spans 1 ms of time and a total of 180 kHz of bandwidth. The 1.4, 3, 5, 10, 15 and 20 MHz bandwidth options on the uplink and downlink channels correspond to 6, 15, 25, 50, 75 and 100 PRBs, respectively.

Within the physical layer, a functionality 240 referred as the Radio Resource Management (RRM) performs the mapping between the logical channels and physical channels. The RRM also schedules the various UEs and their services in the uplink and downlink according to their respective priorities, and it makes the selections of Modulation and Coding Scheme (MCS).

As is well-known, control information of various kinds is broadcast by the eNodeB. The control information broadcast by each sector includes a Master Information Block (MIB) and as many as thirteen different System Information Blocks (SIBs). The MIB and the SIBs are Radio Resource Control (RRC) messages. The MIB is sent on the Primary Broadcast channel (PBCH). The SIBs are sent in the secondary logical broadcast channel carried by the Physical Downlink Shared Channel (PDSCH).

The System Information Block Type 1 (SIB1) contains a parameter referred to as PLMN-id, which identifies the particular network. It should be noted in this regard that the same network operator may operate in different regions under different values of the PLMN-id. However, in the context of the resource sharing that is to be described below, when two networks have different PLMN-ids, they should be understood as networks under different operators, sharing at least part of a common geographical area.

The System Information Block Type 3 (SIB3), System Information Block Type 4 (SIB4) and System Information Block Type 5 (SIB5) contain cell re-selection information and neighbor lists for use in handover operations.

We will now discuss some basic features of cellular network resource sharing as we envisage it.

Parties of various types may participate in resource sharing. One type of party is the established network operator, such as those that currently provide brand name service to large customer populations. Another is a third party that owns and controls cellular resources but is not a network operator. Such a party may be viewed as a resource broker that, e.g., controls spectrum or builds E-UTRANs and leases them to LTE operators. One example might be a direct TV (DTV) operator leasing Whitespace to cellular operators. The third type of party is neither an operator nor an owner of resources, but instead may borrow resources in order to become an operator. For example, any of the well-known content providers might at some point wish to operate its own cellular network. To do so, it would borrow resources, i.e., spectrum and hardware, from third parties.

In the sharing scenarios that we will describe below, we introduce a new network entity that we refer to as the Sharing Entity (SE). The SE is an independent entity owned and operated by either a third party or an alliance of cellular network operators who want to take part in resource sharing activities. It coordinates supplies and demands between prospective sharing partners. The sharing partners are different networks, acting through their respective MMEs, that have excess resources to offer for sharing (supplies), or that are requesting, on a temporary basis, a grant of resources from other networks (demands). The MMEs (acting as sharing partners) and the SE (acting as coordinator) take part in a negotiation process, the outcome of which may be a finalized sharing agreement between PLMNs. As will be explained below, the SE also manages the sharing agreements.

Physically, the SE may be deployed as a server hosted by a suitable computing device that is situated at any network node from which it can communicate with the MMEs of the sharing partner networks. Often, it will be advantageous to deploy the SE within a core network. The SE may be hosted, for example, on equipment belonging to a third party or to an alliance of network operators. The SE may alternatively be hosted, on the same machine that hosts a network's MME, although such an option may be less desirable when it is important for the SE to be an independent entity.

Figure 3:
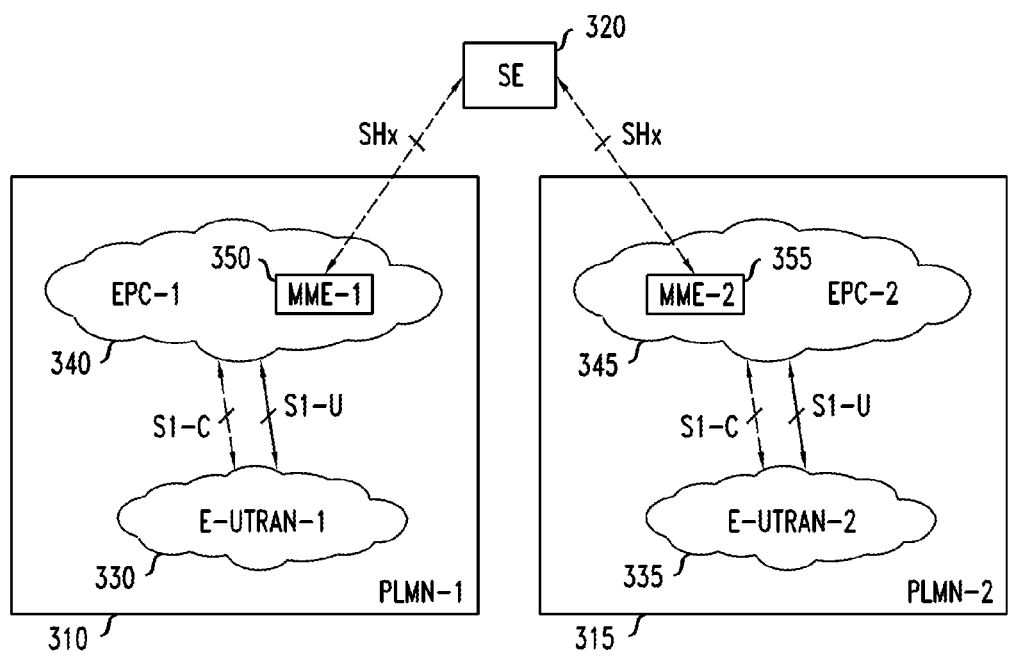
FIG. 3 is a schematic representation, at a high level, of an exemplary architecture in which two LTE networks are operated by two different operators and are candidates for resource sharing with the support of a sharing entity in accordance with an embodiment of the present invention.

FIG. 3 schematically depicts, at a high level, an exemplary architecture in which two LTE networks 310 and 315, denominated PLMN-1 and PLMN-2 in the figure, are operated by two different operators and are candidates for resource sharing with the support of SE 320. As seen in the figure, each network has a respective radio access network 330, 335 and a respective core network 340, 345. Within the core networks are respective MMEs 350, 355. As seen in the figure, each MME communicates with the SE over an IP-based control-plane interface that we have named the SHx interface.

As noted above, the MME serves, on behalf of its network, as the control and decision-making entity for the sharing operations. The MME initiates resource sharing as the representative of its PLMN operator. In particular, it signals to the SE, over the SHx interface, its willingness to engage in a sharing agreement with the other PLMN. The sharing architecture as illustrated is readily extensible to a sharing architecture in which three or more MMEs from different networks connect to the SE and take part in multilateral resource sharing.

In typical scenarios, one SE will be deployed per market, where it will manage all of the neighborhoods that collectively compose the market. "Market" in this regard means the coverage area of an EPC. Thus, for example, a large suburban county might correspond to a market, and its various townships might then be its constituent neighborhoods. Each neighborhood will typically be served by multiple eNBs, and we assume that it will also be served by multiple carriers. Typically, each LTE network operator will assign one MME to a given market to control the eNBs deployed in that market. Since more than one operator may be active in a given market, the market may include multiple MMEs and multiple E-UTRANs, each belonging to a respective operator.

Cellular network resources that may potentially be shared include hardware, spectrum, and capacity. The approach to be described here is directed to network capacity sharing. By capacity, we mean the cumulative serving capability of an entire cellular network or of a sub-network (such an an e-UTRAN) within the cellular network, as quantifiable by the number of subscribed and roaming customers.

It should be noted in this regard that conventional interoperator roaming as currently practiced in cellular networks is a form of network capacity sharing. That is, it requires one network operator to serve the customers of another network operator (i.e., the roaming customers), and thus in effect to share its network capacity with the other operator. However, conventional roaming as a form of capacity sharing is restrictive because it is geographically limited to areas where there is no overlapping service. As will be explained below, we have broadened the roaming idea by adding an open-network strategy in which roaming is not limited to certain areas, but instead is possible anywhere that appropriate inter-operator agreements are in place.

Figure 4:
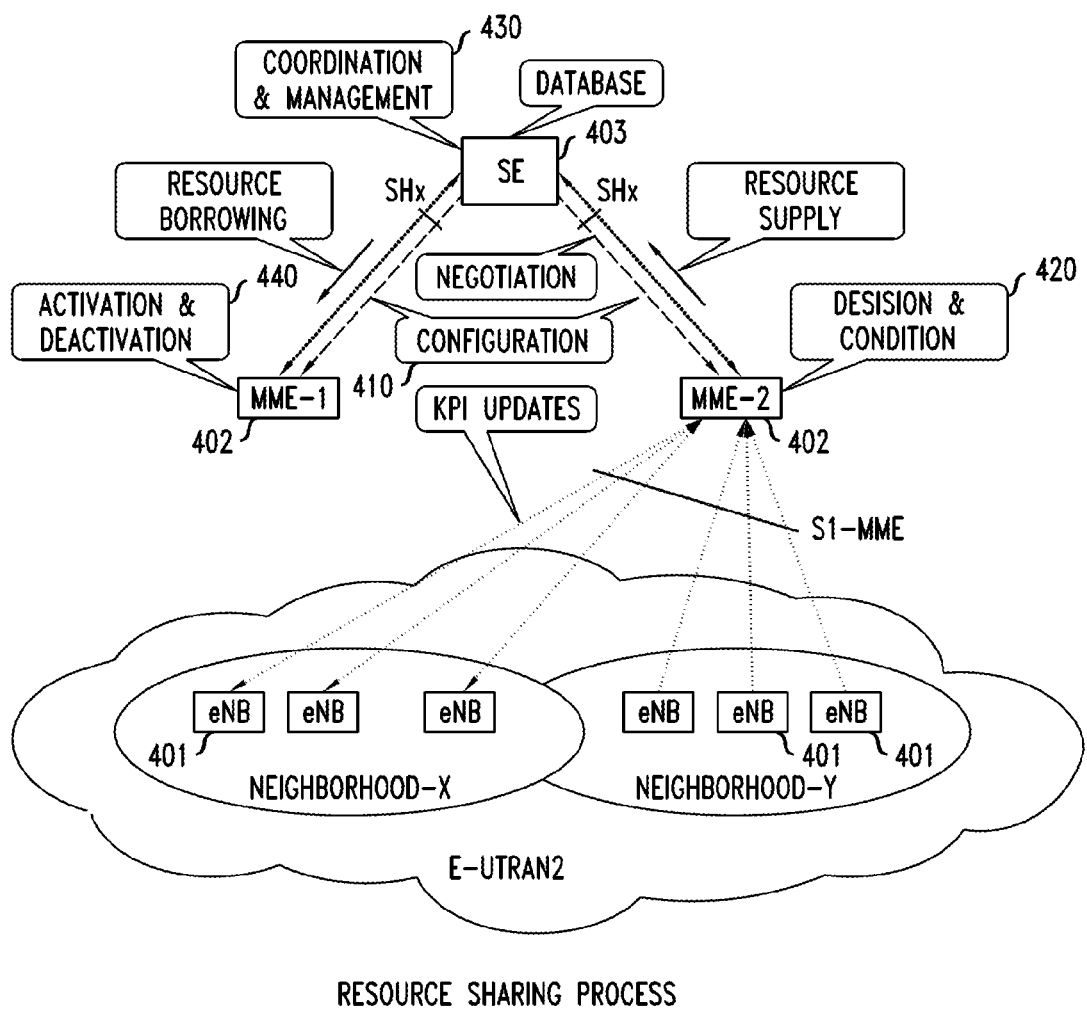
FIG. 4 is a conceptual representation of a sharing process in accordance with an embodiment of the present invention.

FIG. 4 is a conceptual depiction of a sharing process involving eNBs 401, MMEs 402, and the SE 403. The purpose of the process is to create, modify, and dissolve sharing agreements dynamically. In support of that purpose, subsidiary processes activate and deactivate network interfaces and update configurations of network entities such as eNBs.

The sharing process includes four tasks: Configuration 410; Decision and Condition 420; Coordination, Negotiation, and Management 430; and Activation, Deactivation, and Reactivation 440. Each task is discussed, in turn, below.

Configuration.

This task establishes SHx interfaces between the MMEs belonging to various LTE networks and the SE. The SE uses the SHx interface to collect information from the MMEs to build a sharing database. The sharing database contains topological information related to E-UTRANs (including, specifically, the eNBs) and MMEs in the market. The topological information includes among other things the locations and neighborhoods of the network entitites, and the types of wireless services available in the market. The Configuration task runs periodically to update the database when there is any change in topology or any other change in items related to the sharing database.

Decision & Condition.

This task has multiple components distributed among the eNBs, the MMEs, and the SE. One of the components involves measuring or estimating Key Performance Indicators (KPIs). The KPIs are used as input for making sharing decisions. Some of the KPIs that may be useful for that purpose are spectral efficiency, traffic loading, number of active users, spectral utilization or capacity (in terms of radiofrequency bandwidth, for example), co-channel interference, wireline backhaul bandwidth utilization, call-drop statistics, call-blocking probabilities, processor occupancies of various network elements, core network outage rates, and packet drop rates at various network entities. Network elements such as the eNBs measure or estimate the pertinent KPIs and observe their long-term and short-term statistics to assess the performance of the cellular network.

KPIs such as those listed above are conventionally used by operators to drive RF coverage and RAN expansion, spectrum capacity improvement, core network expansion, and other initiatives. However, those skilled in the art will readily appreciate that such KPIs can also be used to make dynamic resource-sharing decisions. Thus, according to one example which is meant to be illustrative but not limiting, one particular KPI, namely the RF bandwidth utilization, may be chosen as the pertinent KPI for making the sharing decisions. Of course in other implementions, other KPIs or combinations of KPIs may be chosen for the same purpose.

In our example, the cells measure their respective spectral utilizations, which they periodically send to the MME over the S1 interface. The MME collects and analyzes the KPIs for all neighborhoods, and it makes short-term and long-term sharing decisions. Once the MME decides to participate in resource sharing, it sends a message to the SE over the SHx interface. The message may be a borrowing request in which the MME (acting for its PLMN) demands additional resources, or it may be an offer of surplus resources that are available for sharing.

Because patterns of resource consumption in cellular networks change dynamically, a surplus resource such as spectrum, hardware, or overall network capacity should be understood statistically as a multi-dimensional random process which changes over time and space. Accordingly, the parameters specified in a sharing agreement will desirably include the nature of the shared resources (e.g. network capacity, which is the subject of the present discussion, but also possibly spectrum or hardware), the time period for sharing, and the geographical area for sharing. The time duration might be, for example, on the order of minutes, hours or days. It could also be made dynamically variable by the sharing partners, and renewable upon expiration. The geographical limitation might be, for example, to specified neighborhoods or markets. The sharing partners might optionally be able to dynamically activate or deactivate sharing in designated neighborhoods.

In at least some cases, it may be advantageous to specify the amount of resource that is to be shared in terms of a number of users. Whatever the measure of shared resources, the sharing network will generally hold back a reserve capacity so that sudden increases in demand can be accommodated.

The service dimension of the sharing agreement might also be changed dynamically. For example, the sharing partners might, by agreement, reserve the power to dynamically exercise admission control by blocking specified services services from inclusion in the sharing agreement.

Various types of events might trigger the MME to issue a sharing message. In one example, the MME is configured with a statistical model of resource usage that takes into account the calendar date, time of day, day of week, and the like. Using historical data and observations of spectral utilization over a recent time window, the model predicts a pattern of resource usage over a period of time. One possible form, among many others, for such a prediction is: "With 90% certainty, spectrum in geographical region r will be utilized at no more than 50%, on average, with a variance of no more than 5%, for the next h hours." The response might be, e.g., for the MME to offer spectrum to geographical region r for h hours, in an amount that is 50% of available spectrum, less a reserve.

Coordination, Negotiation & Management.

This task is mainly carried out by the SE. It involves processing each sharing demand or sharing supply message that comes in from an MME, and coordinating the messages that arrive from different MMEs. It also involves negotiating the sharing agreements between PLMNs (acting through their respective MMEs) and managing the sharing agreements.

Using the sharing database, which may contain among other information a description of network topology and a list of services available in the various neighborhoods, the SE identifies sharing partners and makes them aware of each others' sharing proposals. The identification of potential sharing partners and the matching of offers with demands is based on the sharing conditions (such as the space and time conditions discussed above) specified by the respective MMEs. The SE matches supplying partners to demanding partners to create supply-demand partnerships. Such partnerships may be one-to-many, many-to-one or one-to-one.

The management of sharing agreements by the SE includes dissolving the agreements when the specified sharing periods expire, supporting the modification and termination of active agreements, and also extending agreements through renegotiation.

The negotiation of the sharing agreement may be carried out by any of various well-known protocols, in which the SE acts as the broker. In one simple example, the SE identifies a pair of potential sharing partners that are willing and able to conform to the sharing conditions. An offer passes from one party (the offeror) to the other (the offeree). The offeree may respond with an acceptance, a counteroffer, or a refusal. In the event of a counteroffer, the original offeror may likewise respond with an acceptance, a counteroffer, or a refusal. The exchange terminates when there is an acceptance, a final refusal, or a timeout. The SE then proceeds to another pair of potential sharing partners.

Activation, Deactivation & Reactivation.

This task is carried out by the MMEs. Once the sharing agreement is reached, the sharing partners (MMEs) configure and direct their network elements to activate necessary and special functionalities and interfaces to support the agreement. Specific actions taken by the network elements are discussed in detail below.

As discussed above, the SE is responsible for a proper closure of the sharing agreement. The agreement is dissolved after the agreed time period unless the period has been extended. (For example, some implementations might automatically repeat the offer-and-acceptance protocol between the current parties, with updated parameters, upon issuance of an expiration notice.) Upon expiration of the sharing time period, the SE informs the MMEs over the SHx interface that the sharing is being terminated. In response to the termination notice from the SE, the MMEs reconfigure and direct their network elements to deactivate sharing functionalities and interfaces.

The MMEs collect and analyze KPIs during the sharing period. Based on changes in KPIs, the MMEs may be able to prematurely terminate the sharing agreement, extend the sharing agreement beyond the initially agreed time period, or renegotiate the sharing agreement. Similarly, the MMEs may also respond to requests issued by the SE for modifications or extensions of the sharing agreement. The SE might issue such requests, for example, in response to information received from other potential sharing partners.

Network Capacity Sharing

We will now describe exemplary embodiments of an approach to capacity sharing that we refer to as network capacity sharing. Later, we will describe a second approach, which we refer to as radio access network (RAN) capacity sharing.

In a broad sense, network capacity sharing may be viewed as an inter-operator load balancing scheme. In that scheme, an operator with a lightly loaded network helps to balance the overall traffic load within a market by accepting additional traffic from a heavily loaded operator on a dynamic basis, and by carrying the accepted load.

As noted above, conventional roaming among cellular networks may be thought of as a form of network capacity sharing. However, roaming access as currently practiced is mainly limited to areas that have intermittent coverage or that lack home coverage, so that in order to obtain wireless service, customers must perforce roam into other operators' networks. As will be explained below, we have expanded the roaming concept by applying an open-network strategy that does not limit roaming to certain areas, but instead may in principle permit roaming at all points in the network.

To support our expanded concept of roaming, it is advantageous to have a new, broader type of inter-operator roaming agreement, enhanced protocols and procedures, and enhanced architectural and infrastructural features of the wireless network.

One procedure that is advantageously modified is the procedure as defined, e.g., in 3GPP, by which a UE makes a selection of the serving network and the serving cell. The standard procedure is described at 3GPP TS 25.304, "Evolved Universal Terrestrial Radio Access (E-UTRA) and Evolved Universal Terrestrial Radio Access Network (E-UTRAN)—User Equipment (UE) procedures in idle mode and procedures for cell reselection in connected mode," http://www.3gpp.org/fgtp/Specs/html-info/25304.htm.

According to the conventional procedure, the UE (unless it is a cognitive UE exercising an open network strategy) must give priority to its home PLMN. But under an open network strategy according to some of our new ideas, a UE subject to a sharing agreement that is currently in force may instead apply the same priority all PLMNs involved in the sharing agreement. Accordingly, the UE is free to request access to, or to hand over to, a cell of any of the sharing partner networks.

In an exemplary open network strategy, each UE is provisioned with two or more PLMNs, including at least a Home PLMN and a Roaming PLMN. The provisioned PLMNs are given equal priority for access. Each UE is granted the freedom to select a cell affiliated to any of the equal-priority PLMNs for access based solely on channel quality, without discrimination among the various PLMNs. For such cell selection, channel quality may be signified by, e.g., RSRP or RSRQ.

Under such an arrangement (and given two or more PLMNs acting as sharing partners), the UE concurrently measures the radio channels from cells of all pertinent PLMNs. The UE then selects a serving cell with the best radio channel from any of the PLMNs for access or handover. One basis for choosing the "best" channel is provided by the RSRP; that is, the best channel is the one for which the RSRP is highest.

Configuration information may be broadcast on a control channel to identify the sharing partners to the UEs. In LTE, for example, the necessary configuration information can be broadcast on the SIBs. In one possible implementation, for example, SIB1 is updated to contain the PLMN identities of all sharing partner networks. As a consequence, each affected UE perceives the cells (i.e., the eNBs) of each of the sharing partners as part of its own home network, and therefore as free to be selected for access or handover. In such an implementation, SIB3 and SIB5 may also be broadcasted with updates of the identities of the sharing partners for use in the selection and reselection of serving cells, and they may be updated with neighbor lists that are modified so as to support handover among the partner networks.

It should be noted in this regard that current 3GPP standards support so-called "measurement configuration", in which each of one or more specific UEs provides its own cellsite and neighbor cellsites with periodic or event-based RSRP measurement updates. By means of measurement configuration and other methods discussed above, the eNB that is currently serving a UE can acquire enough information to steer the specific UE to a different PLMN if the UE is eligible and circumstances warrant the transfer. Thus in a handover, for example, the UE will select a target eNB and will notify the target eNB that it has been selected. If the target eNB belongs to a PLMN that is a sharing partner, the PLMN of the target eNB will send confirmation to the source eNB.

The open network strategy described above supports enhanced roaming capabilities through enhancements or modifications at the UEs. Alternatively, modifications may be made at the E-UTRAN, without necessarily requiring configuration changes at the UE. Several possible dynamic approaches, involving modifications at the E-UTRAN, are described below. Such approaches may be more suitable for facilitating dynamic inter-operator roaming agreements. The various approaches listed may be used singly or in combination.

In one approach, multiple PLMN-ids are broadcast on the control message SIB1, which is described in 3GPP 36.331. This makes it possible to logically affiliate a sector or cell of the eNodeB to multiple PLMNs. A given sector thus becomes a multi-PLMN sector which will be regarded as a home network sector by the UEs subscribed to any of the affiliated PLMNs. One consequence is that the idle UEs will be free to access that sector for wireless services.

In another approach, the UEs are provided with a list of neighbor sectors having multiple PLMN affiliations. The neighbor sector information is broadcast on the control message SIB5, which is described in 3GPP 36.331. This information enables the UEs to perform channel quality measurements on the identified neighbor sectors, and thus supports handovers between PLMNs or between network operators.

In another approach, the UEs are configured, via the RRC-ConnectionReconfiguration protocol, to send measurement reports with channel quality information (CQI) related to neighboring sectors affiliated to other PLMNs. (See, e.g., 3GPP 36.331.) Various types of configuration may be appropriate, including configuration for periodic reporting and configuration for event-based reporting, among others.

Another approach which has been briefly discussed above, is steering of the UEs. Steering is a controlled inter-operator transfer of the UE from a (typically, heavily loaded) serving sector to a target cell. In our approach, the target cell is affiliated to a PLMN which has been identified as a partner for capacity sharing. When the current serving sector receives a measurement report from a UE, it applies one or more criteria to determine whether to steer the UE to the partner PLMN.

For example, the determination may be based on a difference in RSRP, a difference in RSRQ, or even on the difference between the respective packet-loss rates experienced by the currently serving sector and the target cell. The determination may also consider the current spectral efficiency of the UE or its achieved SINR, based, e.g., on the downlink CQI. Steering of the UE may be controlled using handover commands according to the RRCConnectionReconfiguration protocol or using redirection according to the RRCConnectionRelease protocol, both of which are described in 3GPP 36.331.

Figure 5:
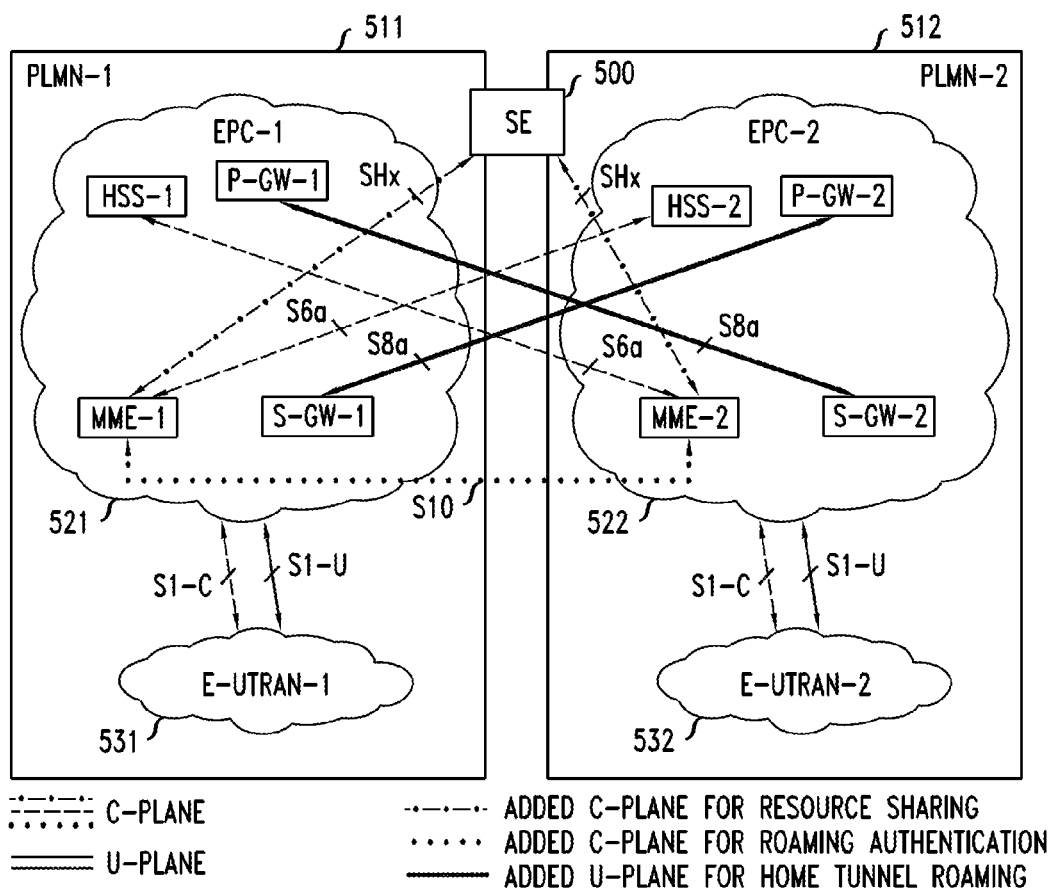
FIG. 5 is a conceptual diagram of a network architecture that supports capacity sharing between LTE networks based on inter-operator home tunnel roaming.

FIG. 5 is a conceptual diagram of a network architecture that supports capacity sharing between LTE networks based on inter-operator home tunnel roaming. Home tunnel roaming is a well known approach to roaming in IP based wireless networks such as LTE networks. In home tunnel roaming, an IP tunnel for user-plane traffic is set up between the S-GW of the host network and the P-GW of the home network. Accordingly, the host network provides the air interface for the roaming UE, but via the tunnel, the home network provides the packet data interface toward the external packet data networks.

As seen in FIG. 5, two networks 511, 512 designated PLMN-1 and PLMN-2 are engaged in capacity sharing. The networks include respective core networks 521, 522 designated EPC-1 and EPC-2, and respective radio access networks 531, 532 designated E-UTRAN-1 and E-UTRAN-2. Sharing Entity 500 supports the sharing process. Each core network includes a respective HSS (HSS-1, HSS-2), a respective MME (MME-1, MME-2), a respective S-GW (S-GW-1, S-GW-2), and a respective P-GW (P-GW-1, P-GW-2).

It will be further seen in the figure that user-plane traffic is exchanged between each S-GW and the P-GW of the other network over an S8a interface to support home tunnel roaming, as described above. The S8a interface is defined in 3GPP. It will also be seen that each MME exchanges control-plane information with the HSS of the other network over an S6a interface to support roaming UE authentication. The S6a interface is defined in 3GPP.

As described above, the SE exchanges control-plane information with both MMEs over respective SHx interfaces to support the sharing process. As seen in the figure, the MMEs also communicate with each other over an S10 interface. Conventionally, the S10 interface handles control-plane traffic supporting inter-MME handovers.

Also indicated in the figure are the S1 interfaces described above.

For purposes of illustration, we will describe actions by E-UTRAN-2 that may initiate capacity sharing. The various cells that belong to E-UTRAN-2 evaluate one or more KPIs on their active channels in order to evaluate the degree of radiofrequency loading. This activity may be implemented, for example, on digital processors that reside at the base stations that serve the respective cells. As explained above, one particular KPI that may be useful in this regard is the RF bandwidth utilization.

It should be noted in this regard that one possible way to evaluate RF bandwidth utilization is by the direct measurement of PRB utilization. In some possible implementations, measured PRB utilization is the sole KPI on which sharing decisions are based. In alternative implementations, any of various other KPIs may be used in combination with, or alternatively to, the measured PRB utilization. Other KPIs that may be useful in this regard include, for example, a measure of the number of users or a measure of system-access blocking probability.

Thus, for example, a low PRB utilization from cells within a given neighborhood may be taken as an indication of light loading, whereas a high percentage of dropped user packets in a given cell may be taken as an indication of heavy loading.

Each cell of E-UTRAN-2 periodically reports its KPIs to MME-2. Based on the received KPIs, MME-2 may declare a given neighborhood to be heavily loaded, or it might declare the neighborhood to be lightly loaded. In the first instance, the MME may initiate a borrowing request, and in the second instance, it may initiate a supply message to the SE. Either event is conditional, because it is conditioned on a determination of heavy or light loading.

One strategy they may be advantageous to a borrowing network is to selectively designate individual UEs for reassignment to the supplier network. That is, the borrowing network ranks the UEs in each of one or more cells according to the degree to which reassignment of each of them is expected to reduce the loading on the borrowing network. The borrowing network then steers one or more UEs that have been selected for high load-reducing ability, in rank order, from the borrowing network to the supplier network.

Various policies may be enforced to limit the sharing process. For example, the inter-operator access and handover parameters may be subjected to limits that are negotiated between the respective MMEs with the support of the SE. Such limits may be useful, for example, to avoid concentrating excessive numbers of users within limited regions, which would otherwise form undesirable hot spots.

More broadly, the network operators may dynamically switch the status of their sharing agreements between, e.g., a restrictive status that permits only conventional roaming and an open status that further permits network capacity sharing as described here. Further conditions might be added to the sharing agreements to constrain the sharing by time, geography, service, or other dimensions. For example, an operator might agree to share its capacity with other networks only when there is an indication that sharing will improve the operator's network performance, increase its RF bandwidth utilization, or enable a particular wireless service.

RAN Capacity Sharing

Above, we have described implementations of capacity sharing according to an approach that we refer to as network capacity sharing. We now turn to a description of further implementations, according to an approach that we refer to as RAN capacity sharing.

Figure 6:
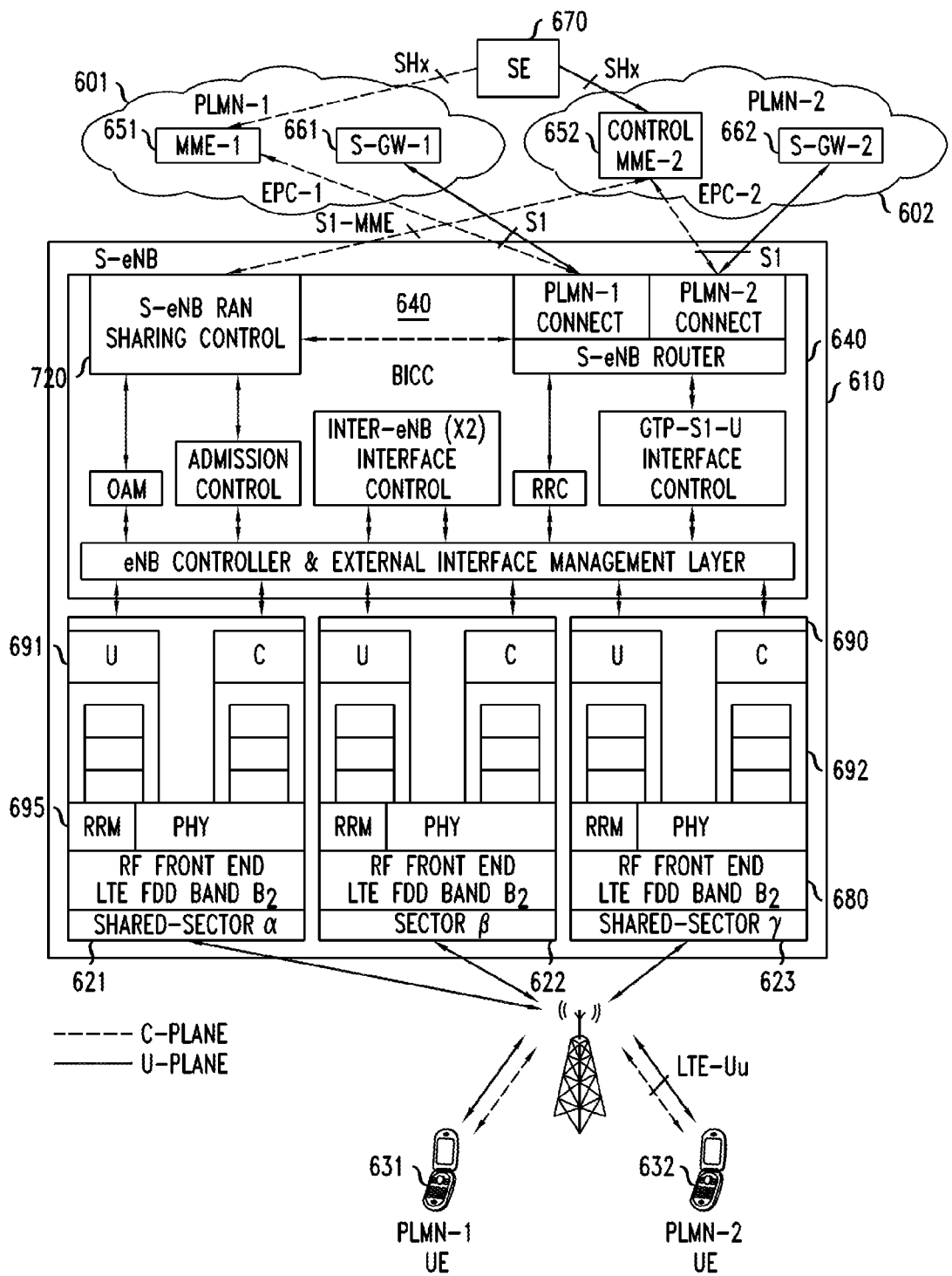
FIG. 6 is schematically depicts an architecture for a three-sector base station that supports an implementation of RAN capacity sharing according to an embodiment of the present invention.

FIG. 6 schematically depicts an architecture for a three-sector base station that supports an implementation of RAN capacity sharing. For purposes of illustration, the figure and accompanying discussion are directed to a base station of an LTE network; i.e., to an eNB. As will be apparent from the following discussion, the eNB of FIG. 6 includes certain modifications that facilitate operations in support of the capacity sharing. We refer to such a modified base station as a "sharing eNB" (S-eNB).

As seen in the figure, the sharing partners are PLMNs 601 and 602, respectively designated PLMN-1 and PLMN-2. Each of the PLMNs communicates with S-eNB 610 over various interfaces to be described below. The S-eNB has three sectors 621, 622, and 623, which are respectively designated Sector α, Sector β, and Sector γ. In the example depicted in the figure, Sectors α and γ are configured to be shared sectors. It should be noted that in practice, any number of sectors that is feasible may be supported, and the operator may choose to share no sectors, to share all sectors, or to share any combination of sectors.

With further reference to the figure, it will be seen that S-eNB 610 communicates with UEs over respective Uu interfaces. Illustrative UEs shown in the figure are UE 631 having PLMN-1 as its home network, and UE 632 having PLMN-2 as its home network.

In the example illustrated by FIG. 6, S-eNB 610 is physically owned by PLMN-2, but it is configured so that logically, it is part of the E-UTRAN of PLMN-1, and also part of the E-UTRAN of PLMN-2. That is, the subscribed customers (UEs) of both PLMN-1 and PLMN-2 see the S-eNB as part of their respective home networks. The UEs of both network operators are treated as home subscribers by the S-eNB. The UEs of each network operator are authenticated and authorized for service by their respective home MMEs.

In addition to a configuration that logically includes the S-eNB in both networks 601 and 602, the S-eNB also has connections over the backhaul to both EPC-1 and EPC-2. This is shown in FIG. 6, where certain components of backhaul interface control card (BICC) 640, to be discussed below, connect over S1 interfaces to MME 651 and S-GW 661 of PLMN-1, or to MME 652 and S-GW 662 of PLMN-2. Moreover, it will be seen in the figure that although both MME 651 and MME 652 connect to Sharing Entity 670 over respective SHx interfaces, it is not necessary to have any direct cross-connection between EPC-1 and EPC-2.

The architecture as described here stands in contrast to the network capacity sharing architecture of FIG. 5. That is, EPCs 521 and 522 of FIG. 5 are cross-connected via S6a, S8a, and S10 interfaces, as explained above. Moreover, the respective E-UTRANs 531 and 532 of FIG. 5 have no direct connection between them.

Turning back to the RAN capacity sharing architecture of FIG. 6, it should be noted that the controlling entity responsible for activation and deactivation of sharing on the S-eNB is the MME of the network operator that owns or controls the S-eNB. Thus in FIG. 6, the controlling entity is MME 652.

Figure 7:
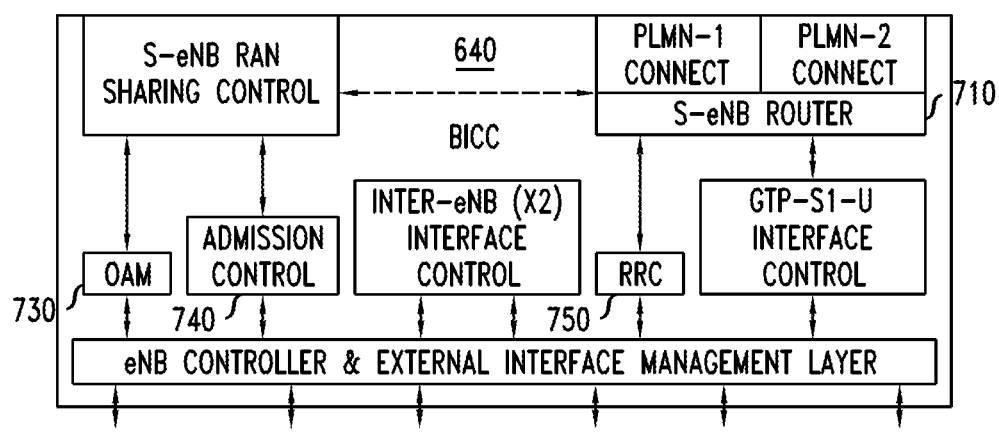
FIG. 7 is an enlarged view of a detail of FIG. 6, showing the backhaul interface control card of the base station of FIG. 6.

BICC 640 includes various entities to support the sharing operations. Such entities are best understood with reference to FIG. 7, which is an expanded view of BICC 640 of FIG. 6. Turning now to FIG. 7, two software modules will be seen that support the activation and deactivation of sharing. The modules referred to are S-eNB router 710 and S-eNB RAN sharing controller 720. As best seen in FIG. 6, sharing controller 720 is connected to the controlling MME 652 (i.e., MME-2 as labeled in the figure) over an S1 control-plane interface.

The controlling MME directs the sharing controller to activate sharing on designated sectors. Thus in the example of FIGS. 6 and 7, MME-2 directs sharing controller 640 to activate sharing with PLMN-1 on Sector α and Sector γ. As a consequence, those two shared sectors are shared by PLMN-1 and PLMN-2. We refer to any sector that is shared among the sharing partner networks as an S-sector.

Turning again to FIG. 6, it will be seen that the hardware components of each sector include an RF front end 680 and a channel card 690. Each channel card supports the user-plane stack 691, the control-plane stack 692, and the RRM 695. S-sector assets that are shared between PLMN-1 and PLMN-2 include spectrum band $B_2$, the RF front end, and the channel card including the RRM and the protocol stacks. Thus, the use of an S-sector as described here can enable both hardware sharing and, indirectly, spectrum sharing between the two PLMNs.

With further reference to FIG. 7, it will be seen that the BICC supports OAM functionality 730, admission control (AC) functionality 740, and radio resource control (RRC) 750. As is well known, the RRC functionality is responsible for network-layer control-plane signalling between the E-UTRAN and the UEs. Among other tasks, the RRC broadcasts system information, supports the establishment and release of connections, and supports the establishment, reconfiguration, and release of radio bearers.

Sharing controller 720 updates OAM and AC parameters, and it updates the RRC configuration. Those UEs that are subscribed to the non-owner network, i.e. to PLMN-1, may be subject to limitations on their network access and admission for services ("differentiation") and to different priorities, relative to the UEs that subscribe to the owner network. The sharing controller advantageously updates the OAM and AC parameters according to the applicable policies on differentiation and priority. In regard to the RRC configuration, the sharing controller updates, among other things, the broadcast parameters that are needed to activate and deactivate the sharing on the α and γ sectors.

Each of the S-sectors announces its affiliation to both networks, i.e. to PLMN-1 and to PLMN-2, by broadcasting the network identities, i.e. the PLMN ids, on SIB1 messages. (SIB messages are specific to LTE. As noted above, other equivalent types of control messages may be used in the context of non-LTE network technologies.) UEs subscribed to both networks, i.e. UEs subscribed to PLMN-1 as well as UEs subscribed to PLMN-2, decode the SIB1 message and in response, both types of subscribing UEs identify the S-sectors as part of their own home networks. Referring back to FIG. 6, the S-eNB connects to both MME 651 of PLMN-1 (i.e., MME-1) and to MME 652 of PLMN-2 (i.e., MME-2). The S-eNB also connects to both S-GW 661 of PLMN-1 (i.e., S-GW-1) and to S-GW 662 of PLMN-2 (i.e., S-GW-2).

Figure 8:
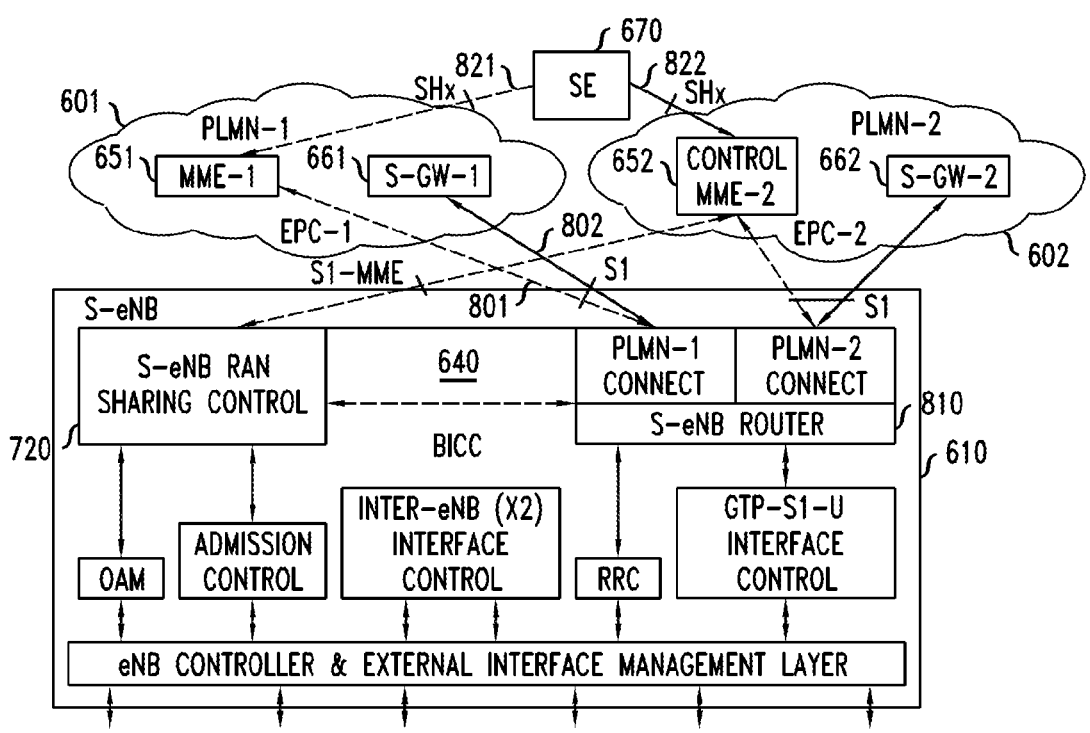
FIG. 8 is an enlarged view of a detail of FIG. 6, showing the backhaul interface control card and the EPCs of FIG. 6.

FIG. 8 is an enlarged detail of FIG. 6, in which elements common with FIG. 6 or 7 are designated by like reference numerals. With reference to FIG. 8, after sharing of the S-eNB with PLMN-1 on the S-sectors has been activated, sharing controller 720 establishes new S1 interfaces to EPC 601, i.e., to EPC-1 of PLMN-1. The new interfaces include S1-MME interface 801 between the S-eNB and the MME-1 and S1-U interface 802 between the S-eNB and S-GW-1. The connection information for the new S1 interfaces, including addresses and port numbers for MME-1 and S-GW-1, is supplied to the sharing controller by the controlling MME 652. The sharing controller also configures the router task 810 in the BICC 640 to enable communication and to route packets between the S-sectors and EPC-1 on the new S1 interfaces.

During the RRC connection set-up procedure, the UEs provide their respective identifications to the S-eNB. Each UE also provides the S-eNB with the identity of each MME and PLMN with which it wishes to register. It should be noted in this regard that the SIM card of a non-cognitive UE will typically contain a list of preferred PLMNs and preferred channels. When selecting a PLMN, such a UE will follow the preferred list. Typically, a UE will also tend to select a PLMN that is effectively a home PLMN (at least under the sharing agreement that is in effect), in preference to a PLMN on which it would be roaming.

The routing task 810 in the BICC creates a routing table based on UE identification and PLMN affiliation. The routing table is used to route C-plane and U-Plane packets to and from the UEs to the affiliated MMEs and S-GWs respectively.

The controlling MME 652 deactivates the sharing on the S-sector by reversing the process of activation.

As explained above, the SE and the respective MMEs collaborate to manage the sharing process that is responsible for the dynamic creation, modification, and dissolution of sharing agreements. The architecture that supports the sharing process has been described above. In the specific context of RAN capacity sharing, the sharing process controls, coordinates, and manages the configuration of the S-sectors for sharing resources of the S-eNB.

As seen in FIG. 8, the SE 670 connects to the MMEs 651 and 652 over respective SHx interfaces 821 and 822. The SE communicates with the respective MMEs to coordinate the S-sector sharing process between PLMN-1 and PLMN-2. Using the sharing process, both PLMNs can dynamically create and change their sharing agreements and accordingly activate and deactivate the S-sector sharing. The respective PLMNs can also place conditions on their agreements in temporal, spatial, service and other dimensions, as explained above.

We claim:

1. A method performed by a processor connected to a node of a wireless core network that controls at least one radio access network (RAN) and is operated by at least a first operator, comprising:
    obtaining at least one key performance indicator (KPI) from one or more cells served by the core network;
    deciding to make a sharing attempt based on the at least one KPI, wherein the sharing attempt is an attempt to borrow or to supply cellular resources that affect capacity;
    announcing the sharing attempt to a sharing entity (SE) embodied in a processor connected to the wireless core network;
    obtaining from the SE the identity of at least one further operator and the terms of a sharing agreement with the at least one further operator;
    configuring the RAN to support borrowing of resources from the at least one further operator or supplying of resources to the at least one further operator according to the terms of the sharing agreement;
    broadcasting messages from the RAN to a population of mobile terminals for configuring the population to permit roaming between a supplying network and a borrowing network having equal network priorities while the sharing agreement is in force; and
    instructing the core network to configure for home tunnel roaming so that the supplying network will provide an air interface for roaming mobile terminals, and via a tunnel, the borrowing network will provide a packet data interface toward external packet networks for the roaming mobile terminals.

2. The method of claim 1, wherein the node of the wireless core network is an MME or an RNC.

3. The method of claim 1, wherein the sharing attempt is an attempt to supply resources, and the configuring the RAN comprises configuring one or more base stations to support mobile terminals that subscribe to the at least one further operator.

4. The method of claim 1, wherein the sharing attempt is an attempt to borrow resources, and the configuring the RAN comprises instructing at least one mobile terminal that subscribes to the first operator to accept service from base stations operated by the at least one further operator.

5. The method of claim 1, further comprising receiving a notice from the SE indicating an expiration of the sharing agreement, and upon expiration of the sharing agreement, dismantling the sharing configuration of the RAN.

6. The method of claim 1, wherein the first operator and the at least one further operator constitute a set of sharing partners, the RAN is configured to permit at least one mobile terminal to roam freely among the sharing partners, and said roaming comprises selecting a serving cell offering a radio channel that is best according to an appropriate figure of merit.

7. The method of claim 1, wherein:
    the first operator and the at least one further operator constitute a set of sharing partners;
    the configuring the RAN comprises transmitting a broadcast message containing update information to at least one mobile terminal;
    and the update information includes identities of the sharing partners, so that the at least one mobile terminal will perceive the sharing partners as its own home networks.

8. The method of claim 1, wherein the deciding to make a sharing attempt is automatically triggered by a change in a loading condition in one of the one or more of cells served by the core network.

9. The method of claim 1, wherein the RAN includes one or more sharing eNode-Bs (S-eNBs) which are adapted to implement at least one sharing agreement on a sector-by-sector basis, and the configuring the RAN comprises activating one or more selected sectors of at least one S-eNB to implement a respective sharing agreement.

10. The method of claim 9, wherein the configuring the RAN comprises updating one or more OAM parameters and admission control parameters stored at the S-eNB.

11. The method of claim 9, wherein the configuring the RAN comprises causing each sector of the S-eNB that has been activated for sharing to broadcast an announcement identifying two or more operators with which it is affiliated, at least one of which is a supplier under the sharing agreement and at least one of which is a borrower under the sharing agreement.

12. The method of claim 1, wherein:
    the RAN belongs to a supplying network operator according to the sharing agreement;
    the further operator is a borrowing operator according to the sharing agreement; and
    the RAN is configured to support roaming, onto the supplying network, of mobile terminals affiliated with the borrowing network.

13. Apparatus comprising:
    a processor configured for obtaining at least one key performance indicator (KPI) from one or more cells served by a wireless core network that controls at least one radio access network (RAN) and is operated by at least a first operator;
    a processor configured for formulating a sharing attempt based on the at least one KPI, wherein the sharing attempt is an attempt to borrow or to supply cellular resources that affect capacity;
    a processor configured for announcing the sharing attempt to a sharing entity (SE) embodied in a processor connected to the wireless core network and for obtaining from the SE an identify of one or more further operators and terms of a sharing agreement with the one or more further operators;
    a processor configured for configuring the RAN to support borrowing of resources from the one or more further operators or supplying of resources to the one or more further operators according to the terms of respective sharing agreements;
    a processor configured for broadcasting messages from the RAN to a population of mobile terminals for configuring the population to permit roaming between a supplying network and a borrowing network having equal network priorities while the respective sharing agreement is in force; and
    a processor configured for instructing the core network to configure for home tunnel roaming so that the supplying network will provide an air interface for roaming mobile terminals, and via a tunnel, the borrowing network will provide a packet data interface toward external packet networks for the roaming mobile terminals.

14. The apparatus of claim 13, wherein the apparatus is an MME or an RNC.

15. The apparatus of claim 13, wherein the sharing attempt is an attempt to supply resources, and wherein processor configured for configuring the RAN is adapted to configure one or more base stations to support mobile terminals that subscribe to the at least one further operator.

16. The apparatus of claim 13, wherein the sharing attempt is an attempt to borrow resources, and wherein processor configured for configuring the RAN is adapted to instruct at least one mobile terminal that subscribes to the first operator to accept service from base stations operated by the at least one further operator.

17. The apparatus of claim 13, further comprising a processor configured for receiving a notice from the SE indicating an expiration of the sharing agreement, and upon expiration of the sharing agreement, dismantling the sharing configuration of the RAN.

18. The apparatus of claim 13, wherein:
the first operator and the at least one further operator constitute a set of sharing partners;
the processor configured for configuring the RAN is adapted to transmit a broadcast message containing update information to at least one mobile terminal;
and the update information includes identities of the sharing partners, so that the at least one mobile terminal will perceive the sharing partners as its own home networks.

19. The apparatus of claim 13, wherein the processor configured for formulating the sharing attempt is adapted to trigger the sharing attempt by a change in a loading condition in one of the one or more of cells served by the core network.

20. The apparatus of claim 13, wherein the processor configured for configuring the RAN is adapted to activate one or more selected sectors of at least one sharing eNode-B (S-eNB) of the RAN for implementing a respective sharing agreement.

* * * * *